United States Patent [19]

Kazurov et al.

[11] Patent Number: 5,473,451
[45] Date of Patent: Dec. 5, 1995

[54] ACTIVE MATRIX LIQUID CRYSTAL DISPLAYS HAVING DIODES CONNECTED BETWEEN SECOND TRANSISTORS AND SECOND DATA BUSES

[75] Inventors: Boris I. Kazurov; Oleg F. Ogurtsov; Gennadi Y. Krasnikov; Boris P. Chernorotov, all of Moscow, Russian Federation

[73] Assignee: Goldstar Co., Ltd., Seoul, Rep. of Korea

[21] Appl. No.: 166,944

[22] Filed: Dec. 15, 1993

[30] Foreign Application Priority Data

Dec. 22, 1992 [RU] Russian Federation ............ 92015569

[51] Int. Cl.$^6$ ............................ G02F 1/133; G02F 1/136
[52] U.S. Cl. ........................... 359/59; 359/60; 359/68; 345/93
[58] Field of Search ...................... 359/54, 57, 58, 359/59, 60, 68; 345/92, 93; 257/59, 72

[56] References Cited

U.S. PATENT DOCUMENTS

| | | | |
|---|---|---|---|
| 4,781,438 | 11/1988 | Noguchi | 359/59 |
| 5,075,674 | 12/1991 | Katayama et al. | 340/719 |
| 5,191,322 | 3/1993 | Katayama et al. | 345/92 |
| 5,371,351 | 12/1994 | Van Berkel | 250/208.01 |

FOREIGN PATENT DOCUMENTS

| | | | |
|---|---|---|---|
| 1-77026 | 3/1989 | Japan | 359/59 |
| 2-001821 | 1/1990 | Japan . | |
| 5-142572 | 6/1993 | Japan | 359/59 |
| 5-142573 | 6/1993 | Japan | 359/59 |
| 5-281516 | 10/1993 | Japan | 359/59 |
| 2-237431 | 5/1991 | United Kingdom | 359/59 |

*Primary Examiner*—William L. Sikes
*Assistant Examiner*—Tai V. Duong
*Attorney, Agent, or Firm*—Finnegan, Henderson, Farabow, Garrett & Dunner

[57] ABSTRACT

An active matrix for liquid crystal displays having a plurality of picture elements, a plurality of address buses, and a plurality of data buses orthogonal to the address buses. Each picture element includes at least one display electrode; a first switching device coupled between the display electrode and a first respective one of the address buses and a first respective one of the data buses; and a second switching device coupled between the display electrode and a second respective one of the address buses and a second respective one of the data buses, the second switching device including a device for preventing the display electrode from discharging whenever the second respective data bus becomes defective. In another embodiment, the picture element includes a second switching device coupled between the second display electrode and the first respective address bus; a third switching device coupled between the first display electrode and a second respective one of the address buses and a respective one of the data buses; and a fourth switching device coupled between the second display electrode and the second respective address bus and the respective data bus, at least one of the third and fourth switching device including device for preventing the display electrodes from discharging when the respective data bus becomes defective.

16 Claims, 9 Drawing Sheets

ACTIVE MATRIX LIQUID CRYSTAL DISPLAYS HAVING DIODES CONNECTED BETWEEN SECOND TRANSISTORS AND SECOND DATA BUSES

BACKGROUND OF THE INVENTION

1. Field of the Invention

This invention relates to active matrix liquid crystal displays and more particularly to liquid crystal displays with redundancy of matrix elements.

2. Description of the Related Art

Demands for liquid crystal displays (LCD) for television, video and computing equipments have greatly increased. For high image quality, the high operational reliability of the active matrix LCD is usually obtained by providing redundancy in the matrix elements of the display.

Figure 1:
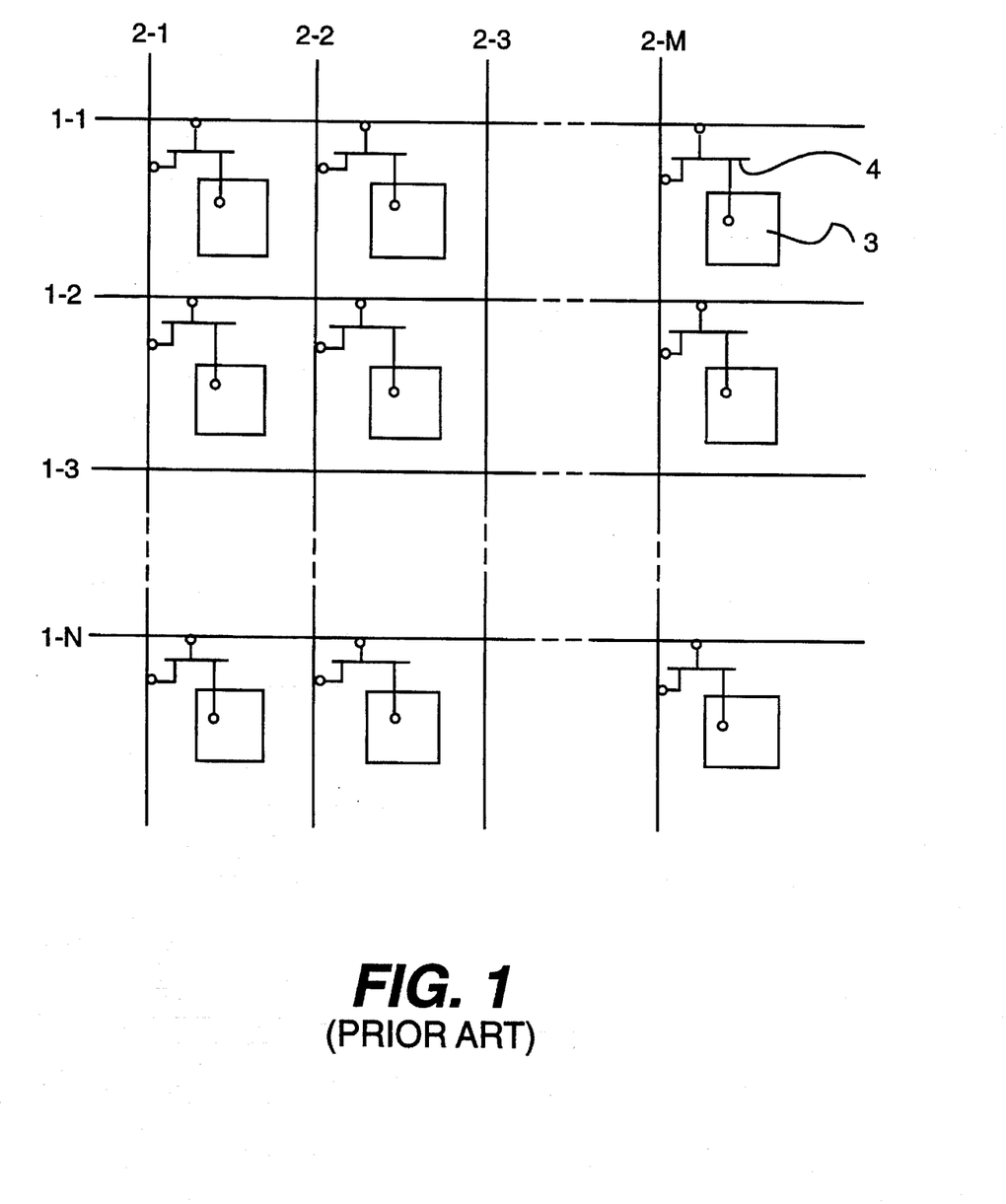
FIG. 1 is the circuitry for a known active matrix LCD.

The active matrix LCD having a plurality of picture elements formed on an insulator substrate in a matrix of n rows and m columns orthogonal to one another has been known. See laid-open Japanese patent application, N 60-192369, H01L 29/78, for example. Referring to FIG. 1, each picture element in the matrix includes a display electrode 3 and a switching element such as a switching thin film transistor "TFT" 4.

More specifically, the active matrix LCD includes a plurality of address buses 1-1, 1-2, 1-3, . . . , 1-n, each address bus corresponding to and a respective one of the rows of the picture elements and a plurality of data buses 2-1, 2-2, 2-3, . . . , 2-m, orthogonal to the address buses each data bus corresponding to a respective one of the columns of the picture elements.

The display electrode 3 of each picture element is connected to the respective address and data buses through the TFT 4. Scanning signals are applied to the address buses; video signals are applied to the data buses. A gate G of each TFT 4 is connected to the respective address bus; a drain D to the respective data bus; a source S to the display electrode 3.

Such an active matrix LCD has drawbacks, resulting in low operational reliability, in that while the defective switching transistor causes the failure of only the picture element that contains such defective transistor, the presence of defects (e.g., line break) in either the address or data bus cause the failure of all of the picture elements connected to such defective address or data bus.

Figure 2:
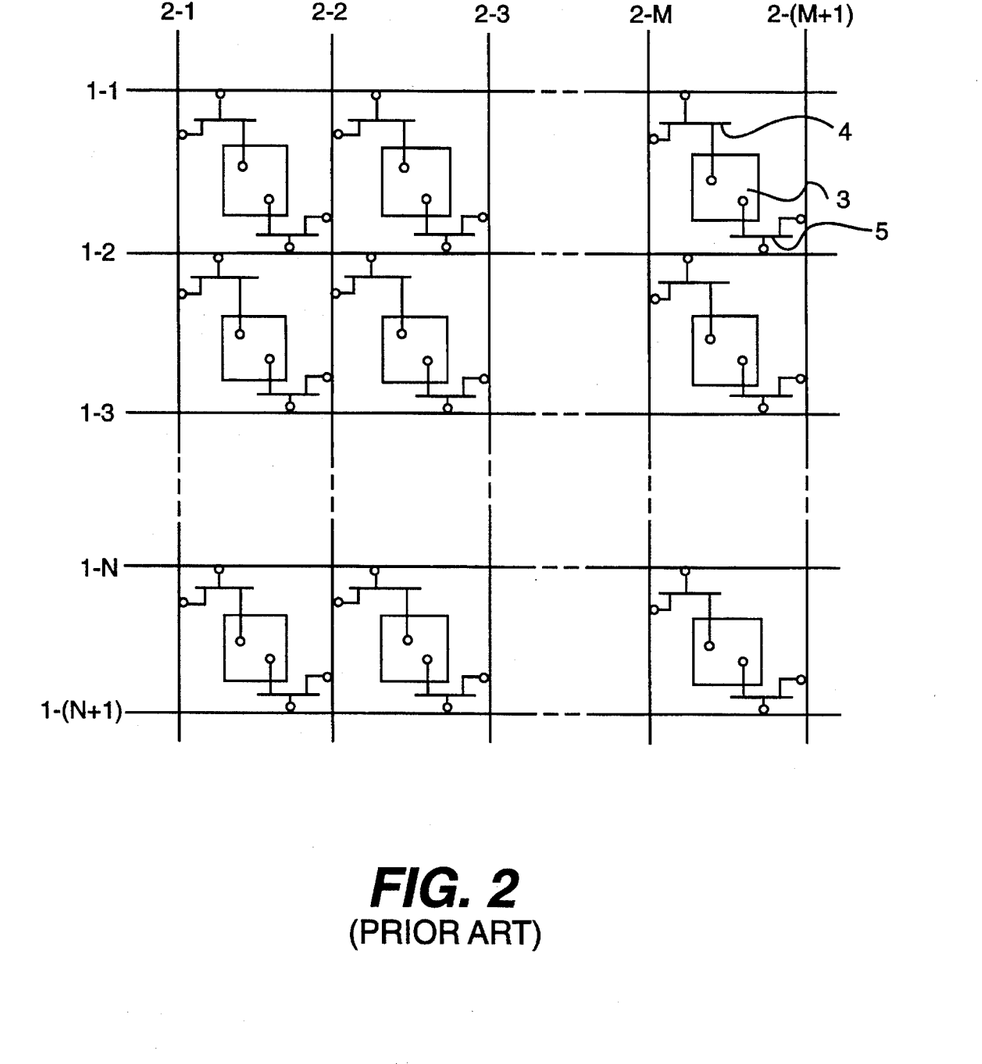
FIG. 2 is the circuitry for another known active matrix LCD.

Attempts to cure such drawbacks have been made. See Demand de brevet d'invention, N 2582431 G09F 3/20, for example. In such attempts, the active matrix LCD provides redundancy in the matrix elements. Referring to FIG. 2, each picture element now includes two switching elements, first and second switching TFTs 4, 5 adjacent and opposite sides of the display electrode 3.

In this configuration, the display electrode 3 is connected to two sets of the address and data buses via two switching elements. The first TFT 4 is connected between the display electrode 3 and a first set of the address and data buses (i.e., 1-1 and 2-m, respectively), and the second TFT 5 between the display electrode 3 and a second set of the address and data buses (i.e., 1-2 and 2-(m+1), respectively).

In such an active matrix LCD structure, if any one of the TFTs 4, 5 of the picture element becomes defective, it would not cause the failure of the picture element since the signals can still be supplied to the display electrode through the remaining nondefective TFT. Further, the defective TFT can be removed from the matrix by means of laser beam, mechanical treatment or chemical etching. Yet further, if any one of the two address buses adjacent the picture element becomes defective, the operation of the picture element would not fail because the scanning (or address) signal can still be supplied to the display electrode through the remaining nondefective address bus. However, the above active matrix LCD has drawbacks in that if any one of the data buses becomes defective, the operation of all of the picture elements connected to such a defective data bus would fail because there is no alternate path for the video signal which would otherwise be supplied to the display electrode through the defective data bus.

Referring to FIG. 2, suppose that a scanning signal is applied to a first address bus 1-1 and that during this time, the display electrodes 3 is connected, through the TFT 4, to a first data bus 2-m. Then, the display electrode 3 will be charged to the voltage of the video signal applied to the first data bus 2-m. Further, suppose that another scanning signal is subsequently applied to a second address bus 1-2 and that during this time, the display electrode 3 is connected, through the TFT 5, to the second data bus 2-(m+1) that is defective. Then, the display electrode 3 will be discharged to the voltage (i.e., could be floating) of the defective second data bus 2-(m+1). Consequently, since the voltage at the defective second data bus may be floating (i.e., unstable), the operation of all of the picture element connected to the defective second data bus become uncontrollable.

The data bus can become defective by bad electrical contacts between the data bus and the driving circuitry, which circuitry supplies the video signal to the data bus. Defects in the output elements of the driving circuitry can also result in the defective data bus. These defects can result in the absence of the video signal on the data bus. Since the nature of defects on the data bus can be unpredictable, when the display electrode 3 is connected to the defective data bus, the operation of all of the picture elements connected thereto could become uncontrollable, and in certain situation electrically ground the display electrode.

Further, in the above active matrix, since the second switching TFT 5 can conduct currents in two opposite directions (i.e., both forward and reverse), the display electrode 3 is allowed to not only charge but also discharge through the TFT 5. In other words, the display electrode 3 can be discharged to the voltage of the defective data bus through the TFT 5.

SUMMARY OF THE INVENTION

The object of the present invention is to overcome the above mentioned drawbacks to obtain high operational reliability.

The active matrix for liquid crystal displays, according to an embodiment of the present invention and broadly defined herein, has a plurality of picture elements, a plurality of address buses, and a plurality of data buses orthogonal to the address buses. Each picture element comprises at least one display electrode; a first switching means coupled between the display electrode and a first respective one of the address buses and a first respective one of the data buses; and a second switching means coupled between the display electrode and a second respective one of the address buses and a second respective one of the data buses, the second switching means including means for preventing the display electrode from discharging whenever the second respective data bus becomes defective.

According to another embodiment of the present invention, each picture element of the active matrix for liquid crystal displays comprises first and second display electrodes spaced from one another; a first switching means coupled between the first display electrode and a first respective one of the address buses; a second switching means coupled between the second display electrode and the first respective address bus; a third switching means coupled between the first display electrode and a second respective one of the address buses and a respective one of the data buses; and a fourth switching means coupled between the second display electrode and the second respective address bus and the respective data bus, at least one of the third and fourth switching means including means for preventing the display electrodes from discharging when the respective data bus becomes defective.

According to yet another embodiment of the present invention, each picture element of the active matrix for liquid crystal displays comprises first and second display electrodes spaced from one another; a first switching means coupled between the first display electrode and a first respective one of the address buses and a first respective one of the data buses; a second switching means coupled between the second display electrode and the first respective address bus and the first respective data bus; a third switching means coupled between the first display electrode and a second respective one of the address buses and a second respective one of the data buses; and a fourth switching means coupled between the second display electrode and the second respective address bus and the second respective data bus, at least one of the third and fourth switching means including means for preventing the display electrodes from discharging when the second respective data bus becomes defective.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitutes a part of this specification, illustrate embodiments of the invention and together with the description, serve to explain the principles of the invention.

DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

As discussed above in reference to FIG. 2, the presence of defects in any data bus in the conventional active matrix LCD circuitry would fail the operation of all of the picture elements connected to such a defective data bus through the second switching TFT 5. In the conventional circuitry, during the time when the scanning or address signal is applied to the display electrode 3 through the second TFT 5 if the second data bus adjacent the picture element, i.e., 2-(m+1), becomes defective, since the second TFT 5 can conduct current in both charging and discharging directions, the display electrode 3 will be discharged to the voltage of the second defective data bus, making the operation of the picture element uncontrollable.

The present invention overcomes this problem. For example, according to the first embodiment of the present invention and referring to FIG. 3, the matrix provides a second switching element 5' as in the matrix of FIG. 2. However, the switching element 5' of FIG. 3 includes an electronic switching device which conducts currents only in one direction. Therefore, when the display electrode 3 is coupled to the second data bus 2-(m+1) through the switching element 5', the display electrode 3 is charged to the voltage of the second bus 2-(m+1), if the voltage of the second data bus 2-(m+1) is greater than the voltage of the display electrode 3. However, if the second data bus 2-(m+1) becomes defective, that is, the voltage of the second data bus 2-(m+1) becomes less than the voltage of the display electrode 3, the display electrode 3 is not discharged to the voltage of the second data bus because the electronic switch device of the switching element 5' does not permit currents to conduct in the discharging direction.

Figure 3:
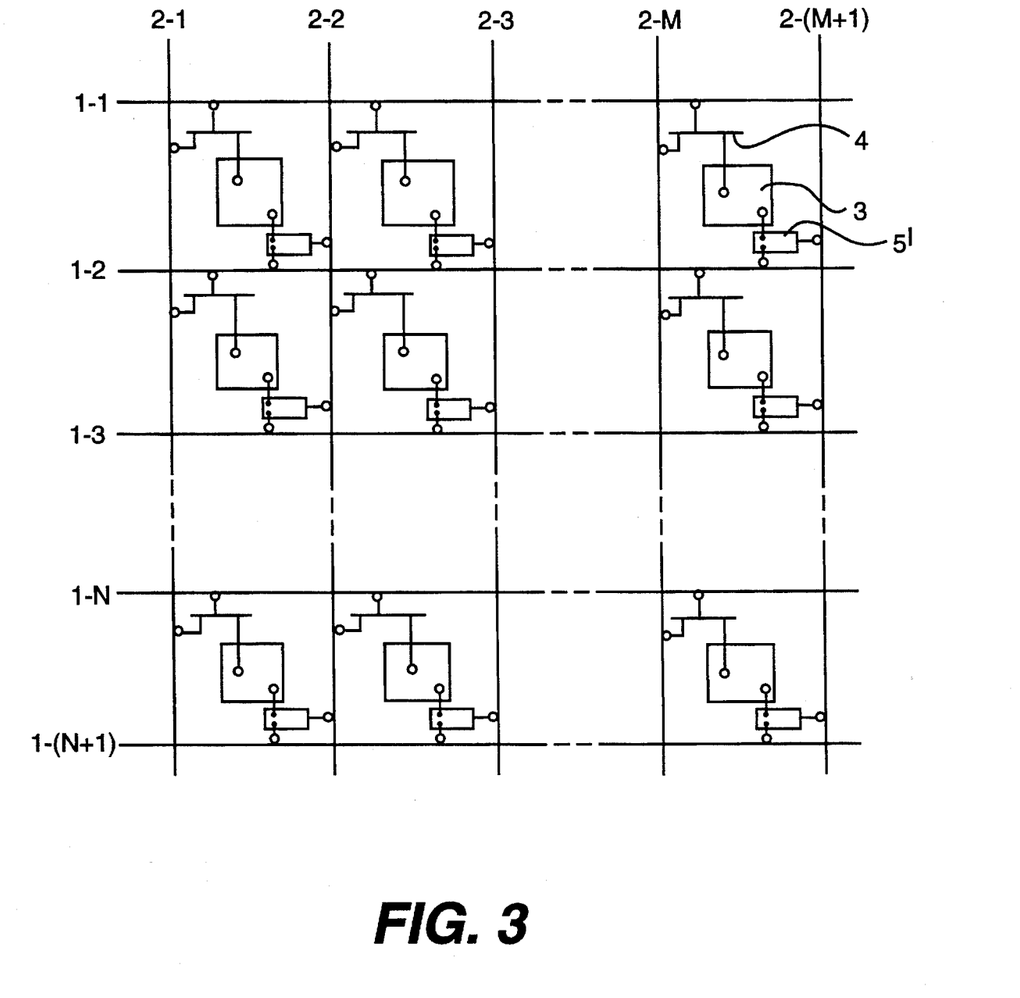
FIG. 3 is the circuitry for an active matrix LCD according to a first embodiment of the present invention.

In other words, even when the second data bus 2-(m+1) becomes defective, since the switching element 5' conduct currents only in one direction, the display electrode 3 will not be discharged to the voltage of the defective data bus. As a result, the voltage supplied through the first switching TFT 4 from the first data bus 2-m is maintained at the display electrode 3 even if the second data bus 2-(m+1) becomes defective. In this manner, the normal operation of the picture element is ensured even when the second switching element 5' of the picture element is connected to the defective second data bus 2-(m+1).

Figure 4:
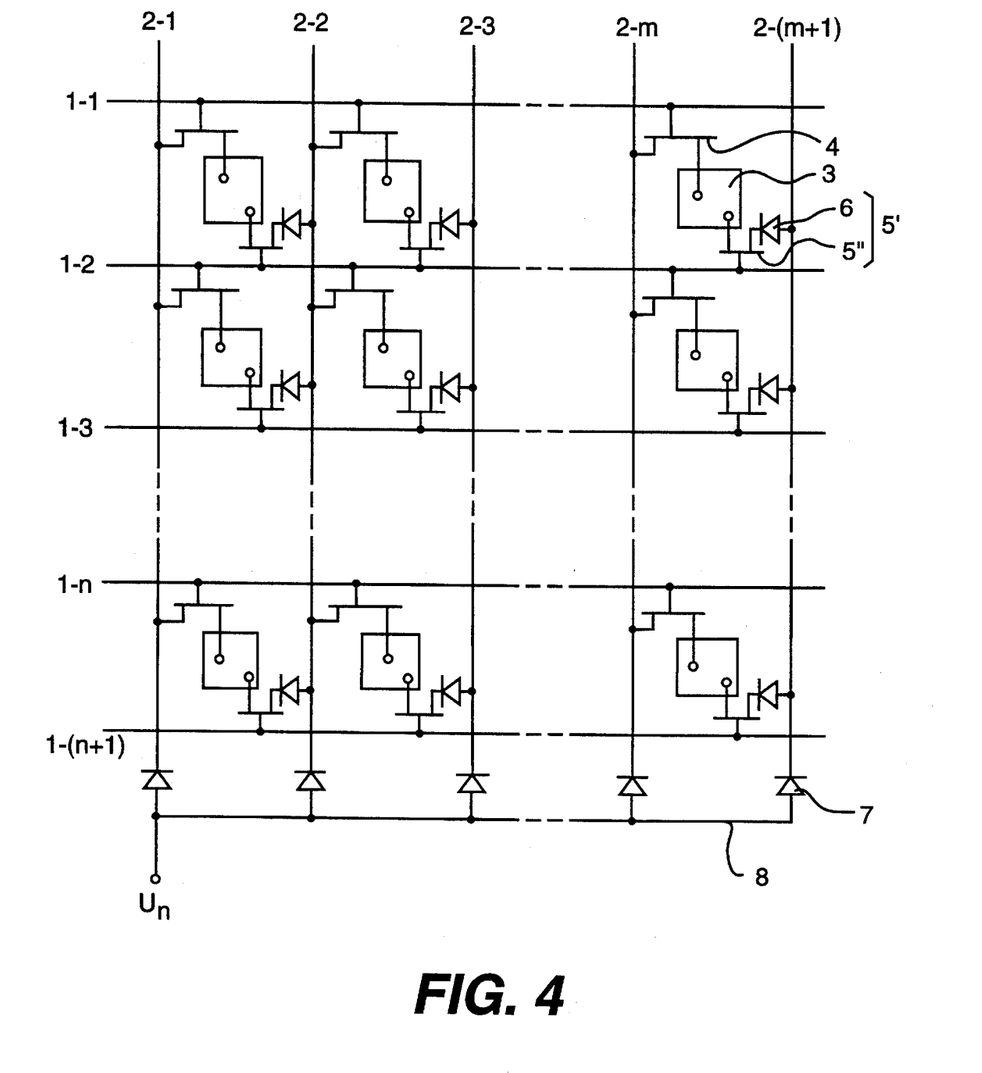
FIG. 4 is a more detailed version of the active matrix LCD of FIG. 3.

FIG. 4 shows a variation from the circuitry of FIG. 3 in that the second switching element 5' of FIG. 3, as embodied herein, includes preferably a MIS (Metal Insulator Semiconductor) 5" and a diode 6. The diode 6 may be referred to the electronic device described above. Further, each of the data buses is connected to (or terminated at) a common LCD electrode having a voltage Un, preferably through a diode 7 (or a resistor) and a bus 8. The voltage Un is preferably equal to a ground voltage, or equal to or less than the minimum voltage level of the video signal on the data bus.

The diode 6 and the MIS 5" of FIG. 4 collectively constitutes the second switching .element 5' of FIG. 3. The polarity of the diode 6 is chosen such that the display electrode 3 can be charged through the second switching element 5' to the voltage of the second data bus 2-(m+1), but can not be discharged through the second switching element 5' to the voltage of the second data bus 2-(m+1) when the video signal is absent, due to defects in the bus, from the second data bus 2-(m+1). In other words, when the second data bus 2-(m+1) becomes defective, the second data bus provides a sufficient voltage in that the diode conducts currents only in the charging direction, that is, reverse biasing the diode, thus preventing the display electrode 3 from discharging through the MIS 5" and the diode 6 to a floating voltage of the defective second data bus 2-(m+1). The diode 6, as embodied herein, preferably includes a Schottsky diode or a transistor having its gate and drain connected to one another.

Figure 5:
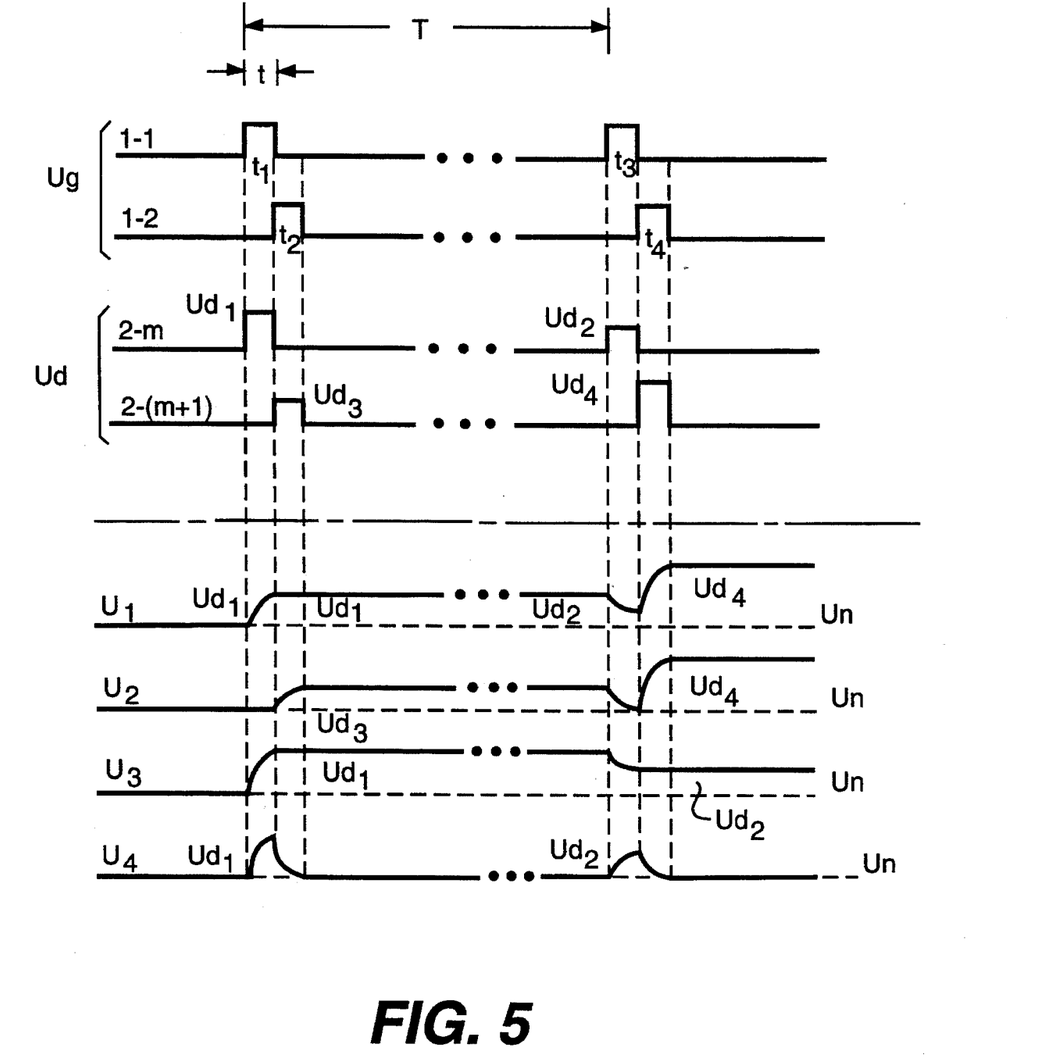
FIG. 5 is a timing chart associated with the active matrix LCD of FIG. 4.

Referring to FIG. 5, Ug refers to the scanning (or address) signal applied to the first and second address buses 1-1 and 1-2 adjacent a picture element. Ud refers to the video signal applied to the first and second data buses 2-m and 2-(m+1) adjacent the same picture element. U1 refers to the voltage at the display electrode 3 of the same picture element of the matrix of the present invention, which display electrode 3 is coupled to the first and second address buses 1-1 and 1-2 and the first and second data buses 2-m and 2-(m+1), when the first and second data buses 2-m and 2-(m+1) adjacent the display electrode 3 are operating (i.e., not defective); U2 the voltage at the same display electrode 3 when the first data bus 2-m is defective; and U3 the voltage at the same display electrode when the second data bus 2-(m+1) is defective. For comparison purposes, U4 refers to the voltage at the display electrode of the conventional active matrix of FIG. 2 (which has no diode in the second switching element) when the second data bus 2-(m+1) is defective.

Each address signal Ug has a pulse having a magnitude U2m of a positive polarity and an identical width t, and a time period T where t=T/n (n is the number of the rows of the picture elements in the matrix). For example, during a time period t1 of the first time period T, the pulse of such an address signal is applied to the first address bus 1-1, and subsequently during a time period t3 of the second time period T, the same pulse is applied to the same address bus. Likewise, during a time period t2 of the first time period T, the pulse is applied to the second address bus 1-2, and during a time period t4 of the second time period T, the same pulse is applied to the same address bus.

During the time period t1 of the first time period T when the pulse is applied to the first address bus 1-1, the TFT 4 connected to the first address bus 1-1 is activated, and the display electrode 3 is charged through the TFT 4 to a video signal voltage Ud1 of the first data bus 2-m. During the time period t2 of the first time period T when the pulse is applied to the second address bus 1-2, the second switching element 5' (e.g., of the MIS 5" and the diode 8) is activated. However, during this time, the display electrode 3 is not recharged because the initially charged voltage Ud1 of the display electrode is greater than a video signal voltage Ud3 supplied from the second data bus 2-(m+1). Therefore, the voltage U1 at the display electrode 3 remains the same voltage Ud1 during the remainder of the first time period T. Similarly, during the time period t3 of the second time period T, the display electrode is recharged to a video signal voltage Ud2 of the first data bus 2-m, and likewise, during the time period t4 of the second time period T, the display electrode is recharged to a video signal voltage Ud4 of the second data bus 2-(m+1) because Ud4>Ud2.

U2 refers to the situation where the first data bus (2-m) becomes defective. In this situation, the voltage of the defective part of the first data bus 2-m is floating, that is, at the voltage Un. As described above, the voltage Un represents the voltage at the liquid crystal cell electrode and is set, through the diode 7 and the bus 8, to a level equal to or smaller than the video signal supplied to the data bus. Alternatively, the diodes 7 may be connected directly so a common "ground" that is Un is set to a zero voltage.

During the time period t1 of the first time period T, since the defective first data bus 2-m is set to Un, the voltage at the display electrode is held at Un. Then, during the time period t2 of the first time period T, the display electrode is charged to Ud3, that is, the video signal voltage of the nondefective second data bus 2-(m+1). For the remainder of the first time period T, the voltage at the display electrode is maintained at Un. Then, during the time period t3 of the second time period T, since the defective part of the first data bus 2-(m+1) is set to Un, the display electrode is discharged to Un. During the time period t4 of the second time period T, the display electrode is charged to the video signal voltage Ud4 supplied from the nondefective second data bus 2-(m+1). Then, during the remainder of the second time period T, the voltage Ud4 is maintained at the display electrode.

U3 refers to the situation where the second data bus 2-(m+1) becomes defective. Since the MIS 5" is activated during the time periods t1 and t2 of the first time period T and t3 of the second time period T, the circuit operates essentially the same way as in U1. However, during the time period t4 of the second time period T, the display electrode 3 is recharged to Ud2, which is the video signal voltage of the nondefective second data bus 2-m. However, during t4, the display electrode 3 is not discharged to Un, that is, the voltage level of the defective part of the second data bus 2-(m+1) since the voltage polarity of the display electrode 3 is opposite that of the diode 6, and the diode 6 is in a "turned off" nonconductive state.

For comparison purposes, U4 refers to the conventional matrix having no diode in the second switching element 5 when the second data bus 2-(m+1) has become defective. In this situation, during the time periods t2 and t4, the display electrode 3 is discharged to Un, that is, the voltage of the defective part of the second data bus 2-(m+1).

Therefore, in contrast to the conventional active matrix LCD structure, in the matrix of the present invention, as embodied herein, even when the second data bus 2-3 becomes defective, the picture element would not fail to operate as long as the first data bus 2-2 is operative. Further, if an output element of the video signal driving circuitry associated with a data bus fails, that is, the video signal is not supplied to such a data bus, the picture elements connected to such a data bus would not necessarily fail, because the video signal would be supplied to the picture elements from an adjacent nondefective data bus.

For the diode 6 (of FIG. 4), various types of diodes such as pin diodes, Schottky diodes, and field-effect transistors having gate and source connected to one another can be used For the second switching element 5', a combination of a thin film switching transistor with a Schottky diode, or of a thin film switching transistor with a MIS transistor with the gate and drain connected to one another is simple in construction and easy to manufacture.

Figure 6:
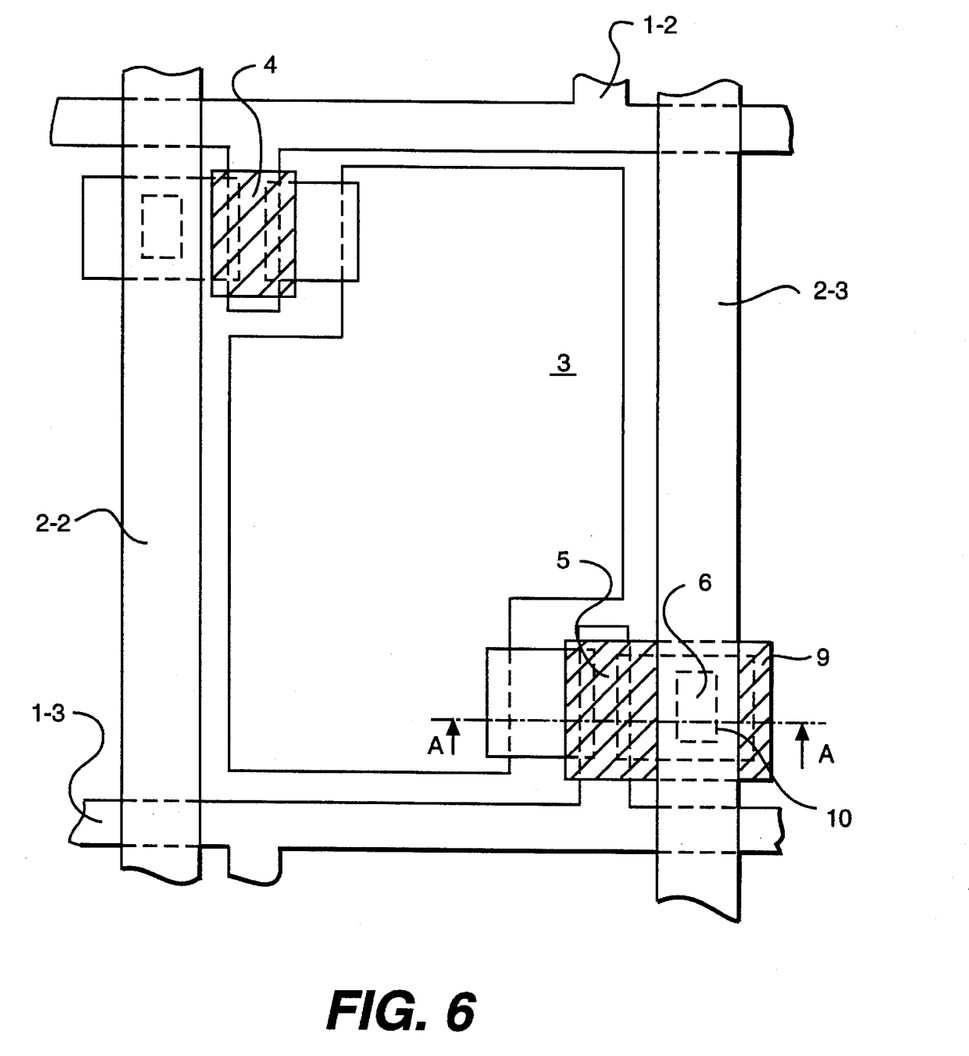
FIG. 6 is the a plan view of a portion of the active matrix LCD of FIG. 4.

FIG. 6 shows a layer out of an exemplary portion of the active matrix LCD of the present invention, which circuitry includes a MIS transistor and a Schottky diode constituting the second switching element 5'. A reference numeral 3 refers to the display electrode; 4 the first switching element; 5 the second switching MIS transistor; 1-2 and 1-3 the first and second address buses, respectively; a 2-2 and 2-3 the first and second data buses, respectively; 6 the Schottky diode. The Schottky diode 6 is formed on an amorphous silicon film 9 between a conductive contact from a phosphorus alloyed amorphous silicon film to the drain of the MIS 5 and a metal contact 9 from a chromium film to the data bus.

Figure 7:
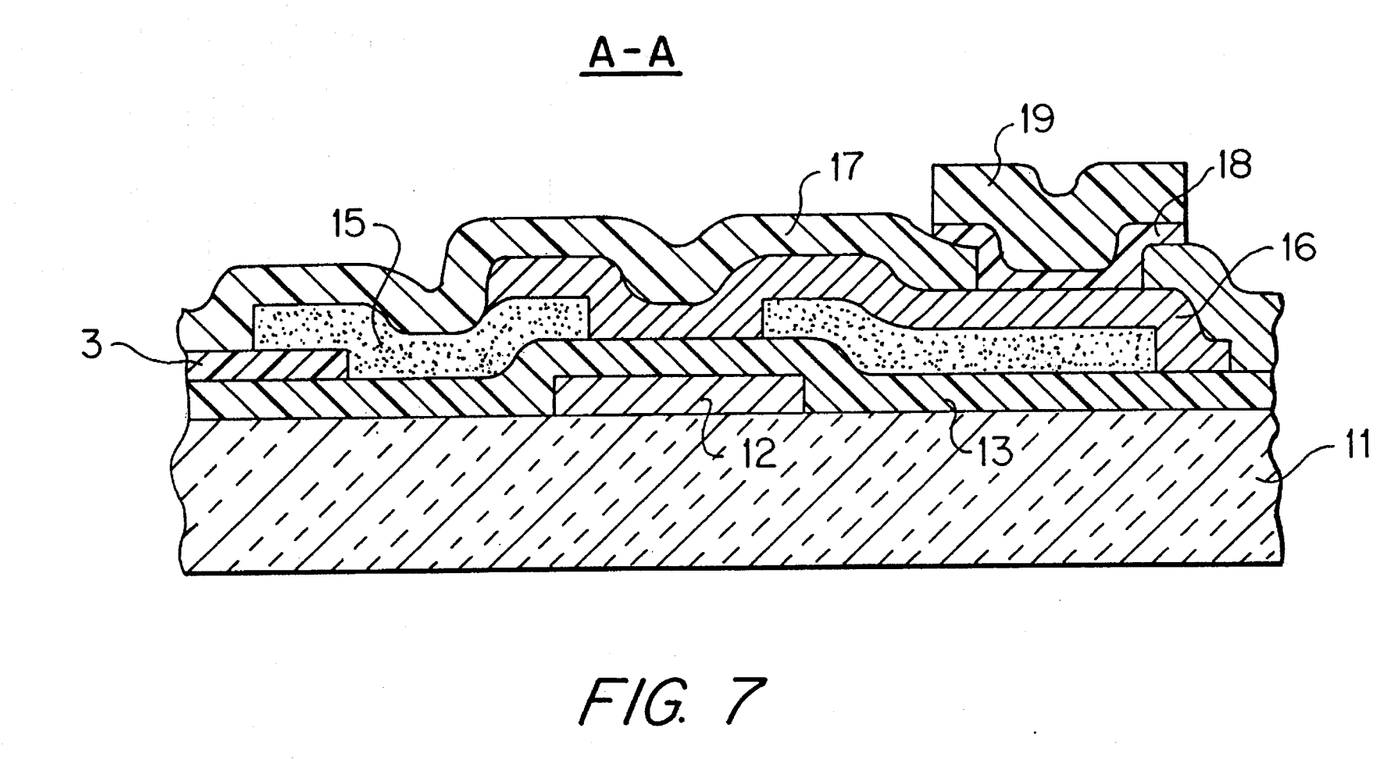
FIG. 7 is a sectional view taken along A—A' of FIG. 6.

FIG. 7 shows a sectional view taken along A—A' of FIG. 6. The structure of FIG. 7 is fabricated as follows. A chromium film was evaporated on an insulator substance 11. The address buses and gates 12 were formed photolithographically from the chromium film. Then, a silicon nitride film 13 was deposited thereon to form a gate dielectric. Then, a transparent conducting film of indium oxide was deposited and the display electrodes 3 were formed from this film. Then, a phosphorus alloyed amorphous silicon film 15 was evaporated successively to form a low ohmic contact to an amorphous silicon. The drain contacts and source contacts of the switching transistors and a contact to the display electrode 3 were formed photolithographically from these films.

Then, an amorphous silicon film 15 was deposited, and the semiconductor regions of the switching transistors were formed photolithographically from the silicon film 15. Subsequently, a silicon nitride film 17 was deposited to a protective dielectric, in which contact windows to the amorphous silicon were opened photolithographically to form Schottky diodes in the switching transistors 5 and contact windows to the drains of the switching transistors 4. Then, a chromium film 18 and aluminum film 19 were successively evaporated and the address buses were formed photolithographically.

Figure 8:
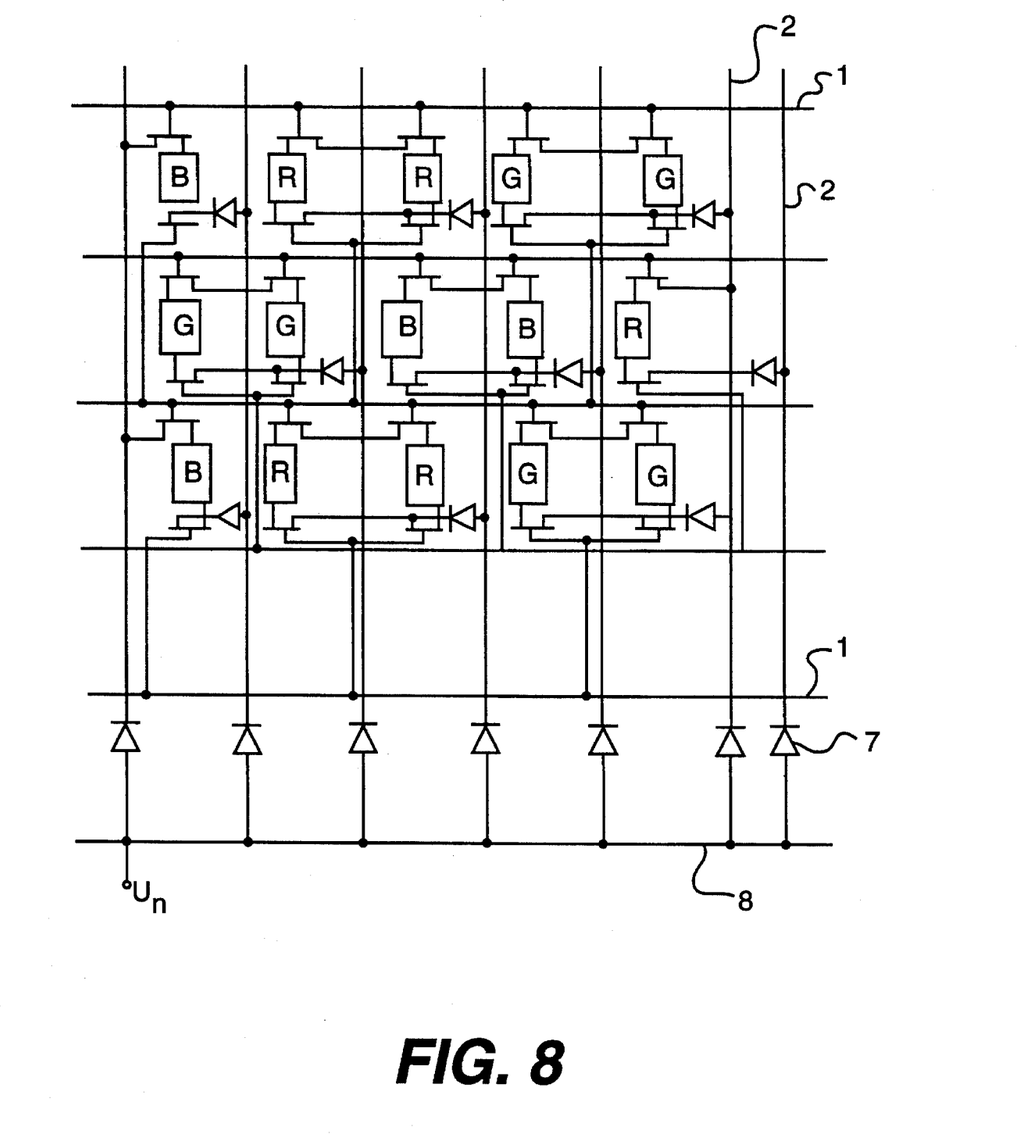
FIG. 8 is the circuitry for a color active matrix LCD according to a second embodiment of the present invention.
Figure 9:
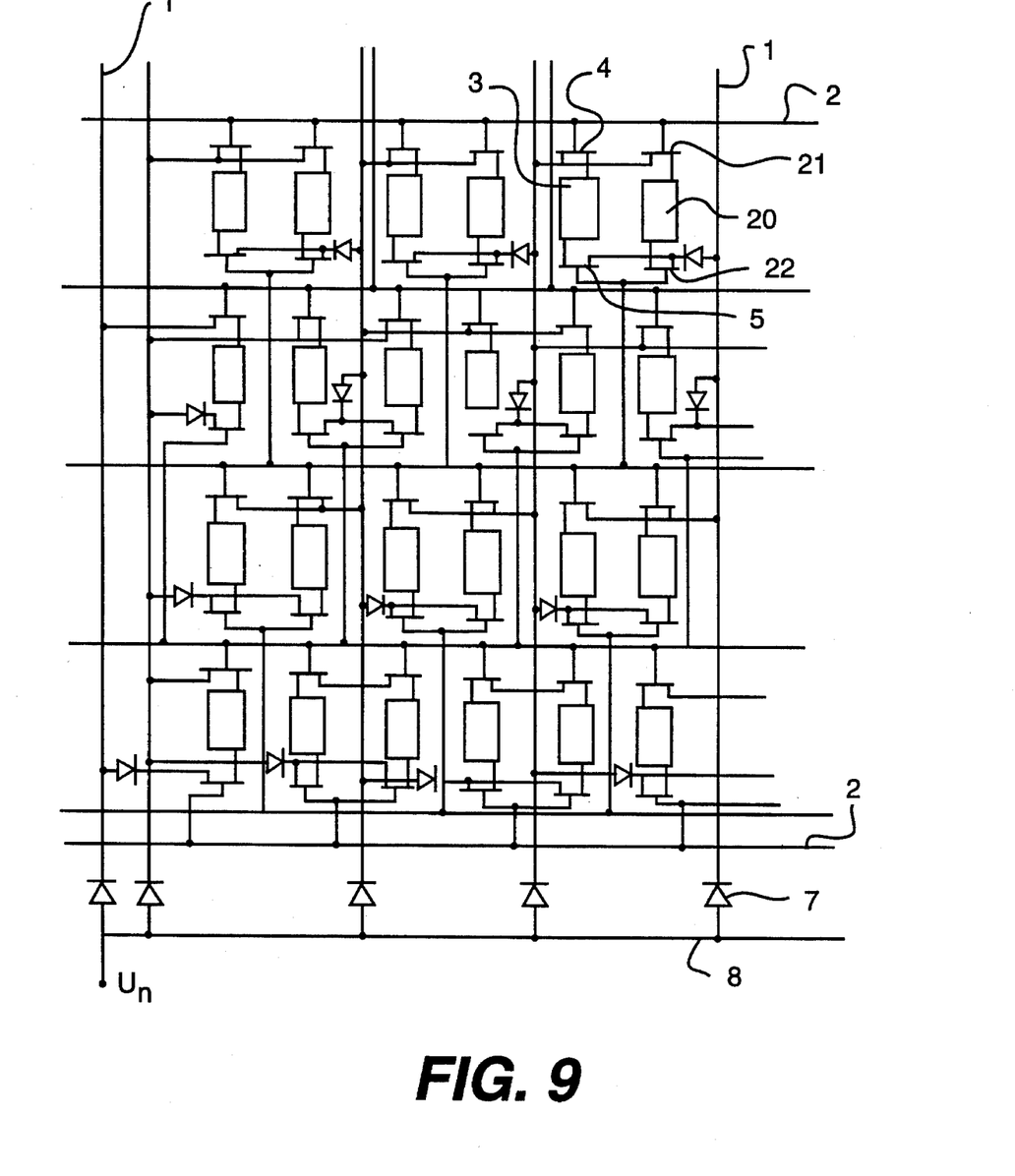
FIG. 9 is a variation from the color active matrix LCD of FIG. 8.

FIG. 8 shows a second embodiment of the present invention and FIG. 9 a further variation therefrom in which each picture element is coupled to a pair of address buses 1 and a pair of data buses 2. These types of active matrix LCDs are used for color displays with a triangular arrangement of color picture elements.

Referring to FIG. 8, each picture element includes a pair of display electrodes. Each display electrode has first and second switching elements. The first switching element of each display electrode is coupled to a first respective one of the address buses, and the second switching element of each display electrode is coupled to a second respective one of the address buses, and also collectively to a respective one of the data buses through a diode. The diode prevents discharging of the display electrode when the respective data bus becomes defective.

Referring to FIG. 9, each picture element includes a pair of display electrodes, a first display electrode 3 and a second display electrode 20. The first display electrode 3 is coupled to a first of the pair of address buses 1 through a first switching transistor 4, and to a second of the pair of address buses 1 through a second switching transistor 5. Likewise, each second display electrode 20 is coupled to the first of the address buses 1 through a third switching transistor 21 and to the second of the address buses 1 through a fourth switching transistor 22. The first and second display electrodes are collectively coupled to a first of the pair of data buses 2 through the first and third switching transistors 4, 21, and to a second of the pair of data buses 2 through the second and fourth switching transistor 5, 22.

The fourth switching transistor 22, as embodied herein, includes a diode 6 between the second display electrode 20 and the second of the data buses 2 in. As explained in reference to FIG. 4, this diode 6 permits the current in the switching transistor 22 to conduct only in one direction, thus preventing the display electrode from discharging to the floating voltage of the defective address bus 2.

Each data bus is coupled to a common bus 8 through a diode 7. The common bus 8 is held at the voltage Un or electrically grounded. The indices R, G, B (of FIG. 8) designate the arrangement of the corresponding color filters on the display panel. The active matrices shown in FIG. 8 and 9 operate in a similar manner as the matrix of FIG. 4. Further, the manufacture process for the active matrices of FIGS. 8 and 9 is similar to the that of the structure of FIG. 4.

In the active matrix LCD of the present invention, as embodied and broadly defined herein, each picture element includes a display electrode and two switching elements in that each display electrode is connected through the first of the switching elements to the first set of the address and data buses, and connected through the second of the switching elements to the second set of the address and data buses. The second switching elements includes an electronic switch which conducts currents only in one direction.

In combination with such an electronic switch, the second switching element may preferably include a MIS transistor. The electronic switch may preferably include a diode which is disposed between the drain of the MIS transistor and the second data bus while the gate of the MIS transistor is connected to the second address bus. The drain and source of the MIS may be interchanged. Each of the data buses may preferably be connected, through a diode or a resistor and a bus, to a common ground or a voltage equal to or smaller than the minimum voltage level of the video signal applied to the data bus signal. The diode of the second switching element may preferably include a Schottky diode or a MIS transistor with its gate and drain connected to one another.

It will be apparent to those skilled in the art that various modifications and variations can be made in the camera and method of the present invention without departing from the spirit or scope of the invention. Thus, it is intended that the present invention cover the modifications and variations of this invention provided they come within the scope the appended claims and their equivalents.

What is claimed is:

1. An active matrix for liquid crystal displays having a plurality of picture elements, a plurality of address buses, and a plurality of data buses orthogonal to the address buses, each picture element comprising:

at least one display electrode;

a first switching means coupled between the display electrode and a first respective one of said address buses and a first respective one of said data buses; and a second switching means coupled between the display electrode and a second respective one of the address buses and a second respective one of the data buses, said second switching means including means for preventing the display electrode from discharging whenever said second respective data bus becomes defective.

2. The active matrix of claim 1, wherein said second preventing means includes a diode.

3. The active matrix of claim 2, wherein said second switching means includes a MIS (Metal Insulator Semiconductor) transistor in combination with said diode.

4. The active matrix of claim 2, wherein said diode includes a Schottky diode.

5. The active matrix of claim 2, wherein said diode include an MIS transistor having a gate and a drain connected to one another.

6. The active matrix of claim 3, wherein said MIS transistor has a source connected to the display electrode, a gate connected to the second respective address bus, and a drain connected to the diode; and the diode is connected to the second respective data bus whereby the current in the diode conducts only in one direction to prevent the display electrode from discharging when the second respective data bus becomes defective.

7. The active matrix of claim 3, wherein said MIS transistor has a drain connected to the display electrode, a gate connected to the second respective address bus, and a source connected to the diode; and the diode is connected to the second respective data bus whereby the current in the diode conducts only in one direction to prevent the display electrode from discharging when the second respective data bus becomes defective.

8. An active matrix for liquid crystal displays having a plurality of picture elements, a plurality of address buses, and a plurality of data buses orthogonal to the address buses, each picture element comprising:

first and second display electrodes spaced from one another;

a first switching means coupled between the first display electrode and a first respective one of the address buses;

a second switching means coupled between the second display electrode and the first respective address bus;

a third switching means coupled between the first display electrode and a second respective one of the address buses and a respective one of the data buses; and a fourth switching means coupled between the second display electrode and the second respective address bus and the respective data bus, at least one of said third and fourth switching means including means for preventing said display electrodes from discharging when the respective data bus becomes defective.

9. An active matrix for liquid crystal displays having a plurality of picture elements, a plurality of address buses, and a plurality of data buses orthogonal to the address buses, each picture element comprising:

first and second display electrodes spaced from one another;

a first switching means coupled between the first display electrode and a first respective one of the address buses and a first respective one of the data buses;

a second switching means coupled between the second display electrode and the first respective address bus and the first respective data bus;

a third switching means coupled between the first display electrode and a second respective one of the address buses and a second respective one of the data buses; and a fourth switching means coupled between the second display electrode and the second respective address bus and the second respective data bus, at least one of said third and fourth switching means including means for preventing said display electrodes from discharging when the second respective data bus becomes defective.

10. The active matrix of claim 8, wherein said preventing means includes a diode between the respective data bus and said at least one of said third and fourth switching means.

11. The active matrix of claim 9, wherein said preventing means includes a diode between the second respective data bus and said at least one of said third and fourth switching means.

12. The active matrix of claim 8 or 9, wherein said preventing means includes a diode.

13. The active matrix of claim 12, wherein said second switching means includes a MIS (Metal Insulator Semiconductor) transistor in combination with said diode.

14. The active matrix of claim 13, said MIS transistor has a source connected to the display electrode, a gate connected to the second respective address bus, and a drain connected to the diode; and the diode is connected to the respective (or second respective) data bus whereby the current in the diode conducts only in one direction to prevent the display electrode from discharging when the respective (or second respective) data bus becomes defective.

15. The active matrix of claim 12, wherein said diode includes a Schottky diode.

16. The active matrix of claim 12, wherein said diode include an MIS transistor having a gate and a drain connected to one another.

* * * * *